(12) United States Patent
Shani

(10) Patent No.: US 7,993,518 B2
(45) Date of Patent: Aug. 9, 2011

(54) PERSONAL FILTRATION DEVICE

(75) Inventor: Ron Shani, Herzliya (IL)

(73) Assignee: Watersheer Ltd. (IL)

( * ) Notice: Subject to any disclaimer, the term of this patent is extended or adjusted under 35 U.S.C. 154(b) by 549 days.

(21) Appl. No.: 11/991,714

(22) PCT Filed: Sep. 6, 2006

(86) PCT No.: PCT/IL2006/001030
§ 371 (c)(1),
(2), (4) Date: Mar. 7, 2008

(87) PCT Pub. No.: WO2007/029243
PCT Pub. Date: Mar. 15, 2007

(65) Prior Publication Data
US 2010/0237002 A1    Sep. 23, 2010

(30) Foreign Application Priority Data

Sep. 7, 2005 (IL) .......................... 170729
May 4, 2006 (IL) .......................... 175416

(51) Int. Cl.
*B01D 29/00* (2006.01)
*B01D 24/00* (2006.01)
*B01D 24/38* (2006.01)
(52) U.S. Cl. .................... 210/236; 210/266; 210/466
(58) Field of Classification Search .............. 210/184, 210/282, 236, 252, 266, 290, 314, 315, 338, 210/398, 416.3, 348, 419, 420, 424, 429, 210/459, 478, 480, 487, 488, 498, 466, 473; 426/298
See application file for complete search history.

(56) References Cited

U.S. PATENT DOCUMENTS

| 768,951 | A | | 8/1904 | Rawson |
|---|---|---|---|---|
| 2,368,035 | A | * | 1/1945 | Moore .......................... 210/317 |
| 4,895,651 | A | * | 1/1990 | Middleton .................... 210/266 |
| 4,986,901 | A | | 1/1991 | Nohren, Jr. et al. |
| 5,417,860 | A | | 5/1995 | Kay |
| 5,601,199 | A | | 2/1997 | Marty |
| 5,609,759 | A | | 3/1997 | Nohren, Jr. et al. |
| 5,688,397 | A | * | 11/1997 | Malmborg .................... 210/266 |
| 5,840,185 | A | | 11/1998 | Hughes et al. |

(Continued)

FOREIGN PATENT DOCUMENTS

CA    2176518    5/1996

(Continued)

*Primary Examiner* — In Suk Bullock
*Assistant Examiner* — Lynne Edmondson
(74) *Attorney, Agent, or Firm* — Abraham Hershkovitz; Harold L. Novick; Hershkovitz & Associates, LLC

(57) ABSTRACT

Personal filtration devices for removable mounting on water discharging spouts in the form of bottlenecks, taps, and the like, for dispensing drinking water for personal consumption. The personal filtration devices preferably include a manually operated open-closed slide valve for correspondingly enabling and disabling dispensing drinking water and hermetically sealing an activated carbon filter media in a sealed environment in its closed position for prolonging the carbon filter media's lifetime. The personal filtration devices are preferably capable of disassembly for rejuvenation purposes, and are removably sealingly slidingly inserted into a sleeve with a resiliently elastic tubular universal adapter for being sealingly slidingly stretched onto water discharging spouts as opposed to screw threaded thereon whereby the universal adapters are capable of being sealingly slidingly stretched onto water discharging spouts of different external diameters.

2 Claims, 4 Drawing Sheets

U.S. PATENT DOCUMENTS

| | | | |
|---|---|---|---|
| 5,914,045 A | 6/1999 | Palmer et al. | |
| 5,928,512 A * | 7/1999 | Hatch et al. | 210/266 |
| 6,004,460 A * | 12/1999 | Palmer et al. | 210/232 |
| 6,136,189 A * | 10/2000 | Smith et al. | 210/266 |
| 6,153,096 A | 11/2000 | Nohren, Jr. | |
| 6,193,886 B1 | 2/2001 | Nohren, Jr. | |
| 6,200,471 B1 | 3/2001 | Nohren, Jr. | |
| 6,284,130 B1 | 9/2001 | Daniel | |
| 6,395,170 B1 | 5/2002 | Hughes et al. | |
| 6,468,435 B1 | 10/2002 | Hughes et al. | |
| 6,478,956 B2 | 11/2002 | Kaura | |
| 6,569,329 B1 | 5/2003 | Nohren, Jr. | |
| 6,733,669 B1 | 5/2004 | Crick | |
| 6,945,289 B2 | 9/2005 | Marszalec et al. | |
| 2005/0051476 A1 | 3/2005 | Chen et al. | |

FOREIGN PATENT DOCUMENTS

| | | |
|---|---|---|
| GB | 2360954 | 3/2000 |
| JP | 11077026 | 3/1999 |
| JP | 2002052382 | 2/2002 |
| JP | 2002321742 | 11/2002 |
| WO | WO 01/09040 | 7/2000 |
| WO | WO 03/011766 | 2/2003 |

* cited by examiner

PERSONAL FILTRATION DEVICE

CROSS-REFERENCE TO RELATED APPLICATION

This application is the National Phase filing of International Application Serial No. PCT/IL2006/001030 filed on 6 Sep. 2006, which is incorporated herein by reference.

FIELD OF THE INVENTION

The invention pertains to personal filtration devices for dispensing drinking water for personal consumption.

BACKGROUND OF THE INVENTION

U.S. Pat. No. 5,928,512 to Hatch et al. illustrates and describes two embodiments of personal filtration devices for mounting on a bottleneck (11) of a flexible thin walled plastic bottle (12). U.S. Pat. No. '512's FIGS. 1 and 2 show a personal filtration device (10) for deployment inside a bottleneck (11), and including a filter element (14) in the form of a porous tubular cylindrical block of activated carbon particles. U.S. Pat. No. '512's FIGS. 3 and 4 show a personal filtration device (41) for externally extending from a bottleneck (11), and including a pre-filter element (60) consisting primarily of a particulate media bed (61), and a pleated paper filter element (66) for serially filtering contaminated water. The personal filtration devices (10) and (41) have threaded connector means for screw threading onto a bottleneck (11) (see U.S. Pat. No. '512, Col. 5, lines 3 to 5, and lines 36 to 39). The personal filtration devices (10) and (41) have an end cap (37) with a manually operated open-closed slide valve (40) (see U.S. '512, Col. 5, lines 10 to 13). However, the aforesaid personal filtration devices do not have arrangements for hermetically sealing their filter arrangements, thereby shortening their lifetimes due to contact with water contents, and airborne free radicals. Moreover, the aforesaid personal filtration devices are intended for screw thread mounting on bottlenecks with specific external thread dimensions. But standard bottleneck sizes do not exist, thereby precluding the aforesaid personal filtration devices for use with other bottles than their intended ones.

SUMMARY OF THE INVENTION

The present invention is directed towards personal filtration devices for removable mounting on water discharging spouts in the form of bottlenecks, taps, army issue canteens, and the like, for dispensing drinking water for personal consumption. The personal filtration devices preferably include a manually operated open-closed slide valve similar to U.S. Pat. No. '512 for correspondingly enabling and disabling dispensing drinking water but additionally designed to concomitantly operate a sealing arrangement for selectively hermetically sealing an activated carbon filter media in a sealed environment in the slide valve's closed position for prolonging the carbon filter media's lifetime. The personal filtration devices are preferably capable of disassembly for rejuvenation purposes. Alternatively, the personal filtration devices can be intended for use for a predetermined time period or filtering a predetermined volume of water, and thereafter discarded.

The personal filtration devices can be provided with conventional threaded connector means for screw threading onto bottlenecks but they preferably include a resiliently elastic tubular universal adapter for being sealingly slidingly stretched onto a water discharging spout such that the personal filtration devices can be mounted on water discharging spouts of different external dimensions. The universal adapters are formed from suitable resiliently elastic material including inter alia silicone, rubber, and the like, and are intended to be repeatedly stretched by up to, say, about 5 mm, from their nominal diameter without tearing or other permanent damage. It is thus envisaged to provide universal adapters with nominal internal diameters starting from about 24 mm and increasing by about 5 mm increments thereby affording personal filtration devices suitable for use with bottlenecks typically having an external thread diameter of about 25 mm to about 28 mm, army issue canteens typically having an external thread diameter of about 50 mm, and the like.

The personal filtration devices can be integrally formed with a resiliently elastic tubular universal adapter but the universal adapters are preferably implemented as discrete sleeves of either a single or a dual material construction. Single material sleeves are wholly formed from suitable resiliently elastic material for sealingly slidingly stretching onto water discharging spouts. Dual material sleeves typically include a rigid plastic tubular fitment integrally formed with a resiliently elastic tubular universal adapter for sealingly slidingly stretching onto water discharging spouts.

Discrete sleeves can be used with conventional filter devices including inter alia the aforesaid Hatch et al. filter device, thereby facilitating their use with water discharging spouts of different external diameters. Also, conventional personal filtration devices for externally extending from a water discharging spout can be formed with a resiliently elastic tubular universal adapter.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE PRESENT INVENTION

Figure 1:
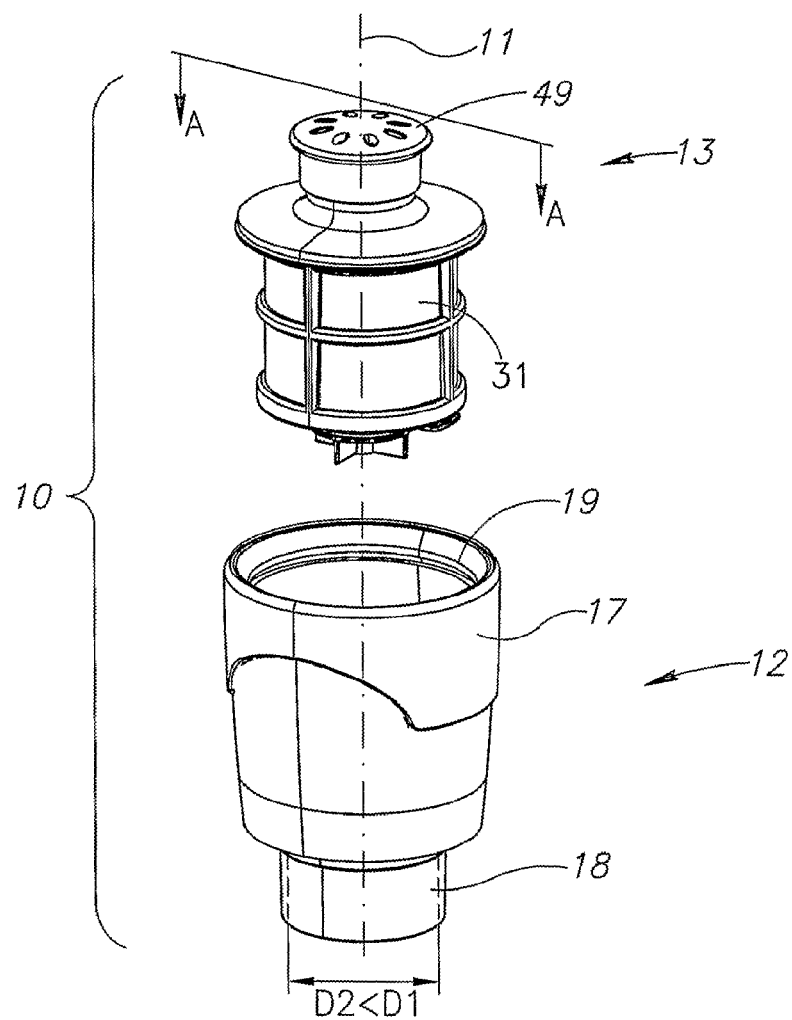
FIG. 1 is a pictorial view of a partially dissembled personal filtration device including a discrete sleeve of a single material construction and a discrete filter device.
Figure 1:
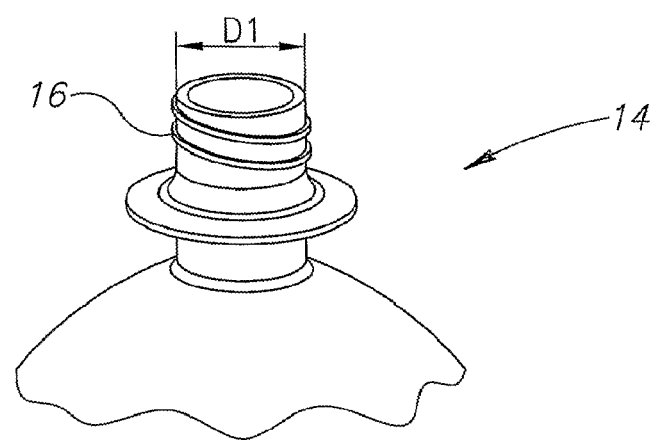
Figure 2:
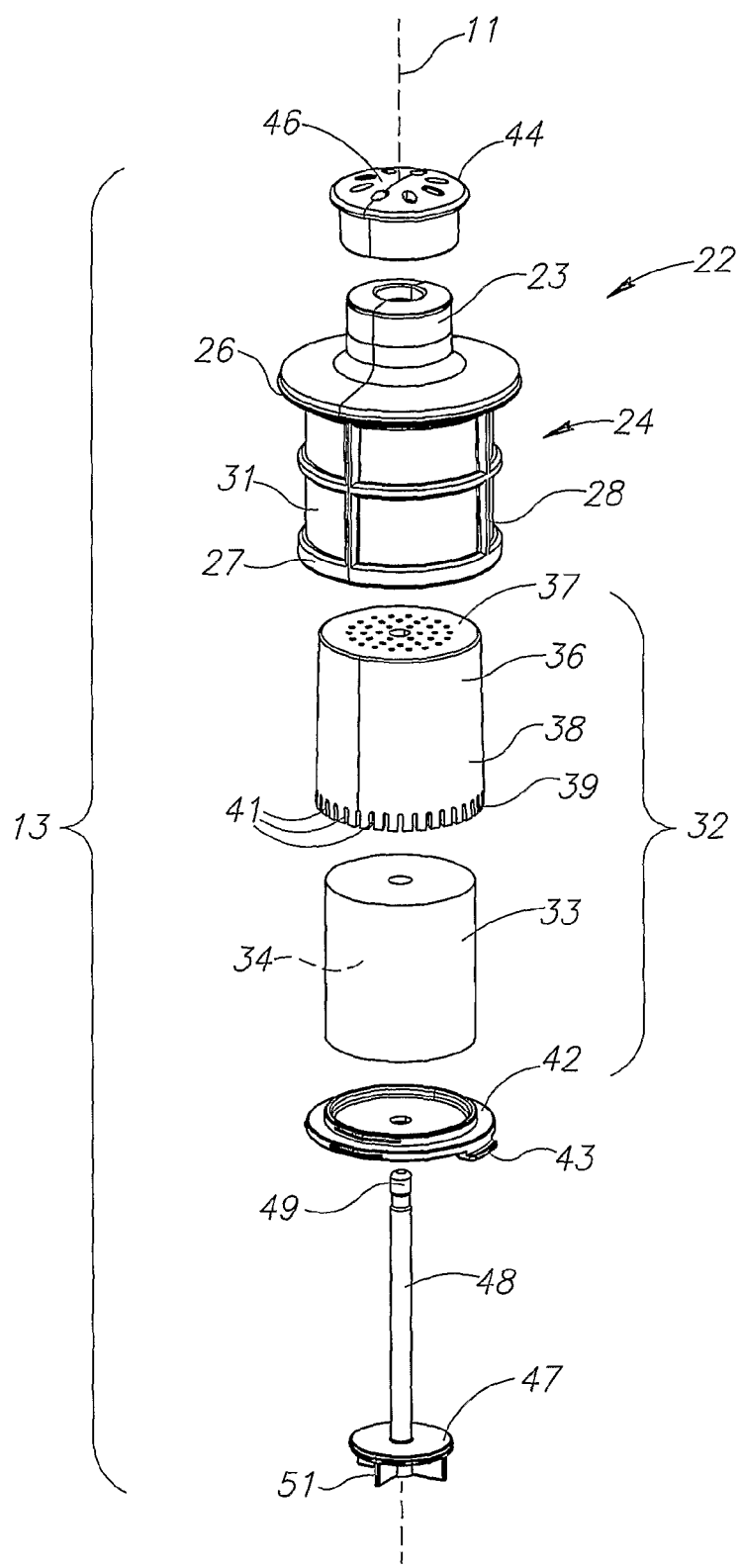
FIG. 2 is an exploded view of a FIG. 1's filter device.
Figure 3:
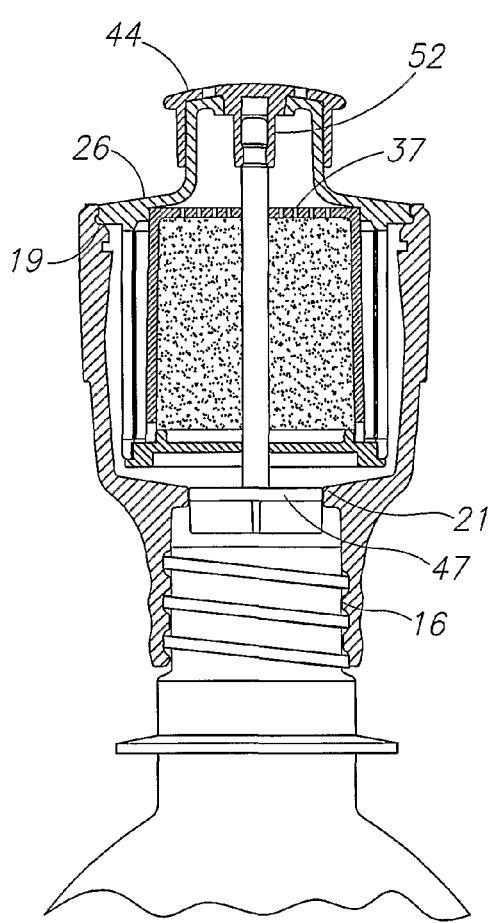
FIG. 3 is a longitudinal cross section of FIG. 1's personal filtration device along line A-A in FIG. 1 in its inoperative state.

FIGS. 1 to 4 show a personal filtration device 10 with a longitudinal axis 11 and including a discrete tubular sleeve 12, and a filter device 13 for use with a conventional flexible thin walled plastic bottle 14 having a bottleneck 16 constituting a water discharging spout. The bottle 14 is typically blow molded of PET or other suitable plastics, and its bottleneck 16 has an external thread diameter D1 in the range of about 25 mm to about 28 mm depending on its volume, manufacturer, and the like. The sleeve 12 has a single material construction and is wholly formed from resilient elastic material such as silicone, rubber, and the like, and includes a major wide diameter portion 17 for sealingly slidingly receiving the filter device 13, and a minor narrow diameter portion 18 having a nominal internal diameter D2 of about 24 mm for being sealingly slidingly stretched onto the bottleneck 16 for creating a hermetic seal. The minor narrow diameter portion 18 sealingly fits over the bottleneck's external screw threads as opposed to tightly matching same in a conventional screw thread arrangement. The major wide diameter portion 17 includes a leading internal annular groove 19 and the minor narrow diameter portion 18 includes a trailing internal annular flange 21 for sealing purposes.

The filter device 13 includes a filter housing 22 having a stepped cross section with a leading narrow diameter discharge port 23 for discharging drinking water and a trailing tubular frame 24. The frame 24 includes a leading annular flange 26 for sealing insertion into the leading internal annular groove 19, a trailing annular flange 27, and four sets of equidistant axially directed external ribs 28. The frame 24 supports a micronic filtration element 31 surrounding a filter casing 32 with a replaceable cartridge 33 of porous activated carbon filter media 34 for serially filtering contaminated water. The micronic filtration element 31 can be implemented by a micronic filtration screen, a series of closely packed filter discs, a pleated paper filter element, and the like. The filter casing 32 has a two part construction including an inverted cup shaped member 36 having a leading perforated end 37, and a solid peripheral wall 38 with a trailing end 39 having axially directed slits 41, and a base 42 for snap fitting onto the cup shaped member's trailing end 39, and having a finger tab 43 for enabling its manual removal therefrom.

Figure 4:
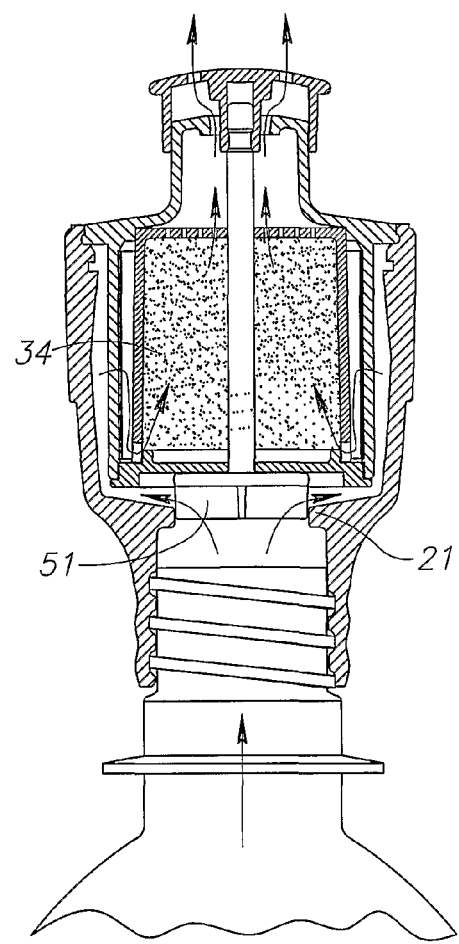
FIG. 4 is a longitudinal cross section of FIG. 1's personal filtration device along line A-A in FIG. 1 in its operative state for discharging drinking water.

The filter device 13 includes a manually operated filter cap 44 with a leading perforated surface 46 constituted by an open-closed slide valve and slidingly reciprocal on the discharge port 23 between a closed position for sealing the discharge port 23 (see FIG. 3), and an open position for dispensing drinking water (see FIG. 4). The filter device 13 includes a circular plug 47 with an axially directed upright spindle 48 having a free end 49 and four downward depending radial ribs 51. The spindle's free end 49 is interference fit inserted into a suitable tubular recess 52 formed on filter cap's underside, thereby enabling disassembly of the filter device 13 for cleaning the micronic filtration element 31, and replacement or rejuvenation of the porous activated carbon filter media cartridge 33. The closed position of the filter cap 44 urges the plug 47 for sealing abutment against the sleeve's flange 21 for hermetically sealing the filter media 34 in a sealed environment for prolonging its lifetime (see FIG. 3). The open position of the filter cap 44 urges the plug 47 such that its ribs 51 are aligned with the sleeve's flange 21, thereby enabling flow communication between a bottle's interior and the filter device 13 (see FIG. 4).

The use of the personal filtration device is now described with reference to the purification of a plastic soft drink bottle filled with contaminated water from a river, a puddle, and the like. The user fills a bottle with contaminated water and drops a chlorine tablet into same. The user waits 10 minutes for treating the contaminated water to remove biological pollutants. The user slidingly stretches the universal adapter onto the bottle's bottleneck to create a hermetic seal, and pulls the filter cap upwards. The user compresses the bottle to force water radially inwards through the micronic filtration element for removing organic and inorganic materials. The water flows through the slits into the filter casing to axially flow through its porous activated carbon filter media towards the discharge port to remove poisonous metals and other dissolved materials, and also neutralizes chlorine. The now filtered water reaches the discharge port for discharge therefrom for drinking purposes, food and beverages preparation purposes, and the like. The user pushes downwards on the filter cap to seal the filter casing in a sealed environment to prolong the lifetime of its porous activated carbon filter media.

The user is required to maintain the personal filtration device the earlier between a predetermined time interval and the filtering of a predetermined volume of contaminated water. The user maintains the personal filtration device by removing it from a bottle, tap, and the like, and removing the filter device from the sleeve. The user pulls the filter cap off the spindle to disassemble the filter device, and removes the micronic filtration element for cleaning under fresh tap water. The user removes the filter cartridge and boils it for about 10 minutes for rejuvenating same. The user re-assembles the personal filtration device in its inoperative state ready for use.

Figures 5, 6:
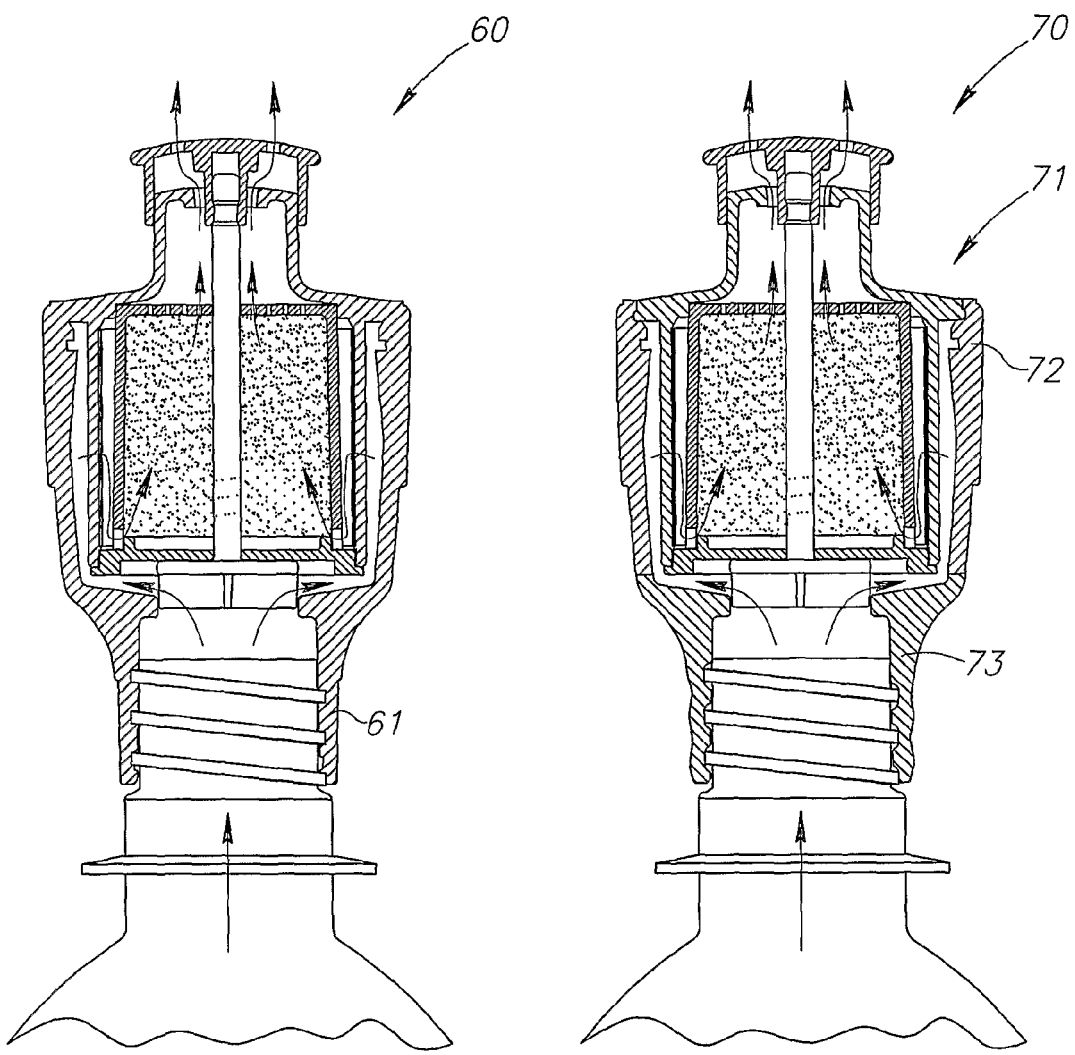
FIG. 5 is a longitudinal cross section of a disposable personal filtration device integrally formed with a rigid plastic adapter for screw threading on a bottleneck with a particular external thread diameter.
FIG. 6 is a longitudinal cross section of a personal filtration device including a discrete sleeve of a dual material construction.

FIG. 5 shows a disposable personal filtration device 60 similar to the personal filtration device 10 but integrally formed with a rigid plastic adapter 61 for screw threading on a bottleneck with a particular external thread dimension in a similar manner to the aforesaid Hatch et al. filter device. The rigid plastic adapter 61 has an internal screw thread tightly matching the bottleneck's external screw thread as opposed to the sleeve 12's universal sealing arrangement.

FIG. 6 shows a personal filtration device 70 similar to the personal filtration device 10 but integrally formed with a tubular sleeve 71 of a dual material construction including a rigid plastic tubular fitment 72 and a resiliently elastic tubular universal adapter 73 integrally formed therewith. Alternatively, the tubular sleeve 71 can be implemented as a discrete item for removable mounting on a filter device using a snap fit connection, a bayonet connection, and the like.

While the invention has been described with respect to a limited number of embodiments, it will be appreciated that many variations, modifications, and other applications of the invention can be made within the scope of the appended claims.

The invention claimed is:

1. A personal filtration device for removable mounting on a water discharging spout for dispensing drinking water for personal consumption, the personal filtration device comprising:
   (a) a filter device for sealingly mounting on the water discharging spout and externally extending therefrom, and having an activated filter component for filtering water passing from the water discharging spout to a discharge port for dispensing drinking water;
   (b) a manually operated filter cap for selectively opening and closing said discharge port for correspondingly enabling and disabling dispensing drinking water from said discharge port;
   (c) a sealing arrangement for selectively hermetically sealing said activated filter component in a sealed environment; and
   (d) a discrete tubular sleeve including a resiliently elastic tubular universal adapter for sealingly slidingly stretching onto a water discharging spout for removably sealingly mounting said filter device thereon wherein said sleeve has a dual material construction including a rigid plastic tubular fitment integrally formed with said resiliently elastic tubular universal adapter, whereby said sleeve enables said filter device to be removably sealingly mounted on water discharging spouts of different external diameters.

2. A personal filtration device for removable mounting on a water discharging spout for dispensing drinking water for personal consumption, the personal filtration device comprising:

(a) a filter device for sealingly mounting on the water discharging spout and externally extending therefrom, and having a filter component for filtering water passing from the water discharging spout to a discharge port for dispensing drinking water;

(b) a manually operated filter cap for selectively opening and closing said discharge port for respectively enabling and disabling dispensing water from said discharge port;

(c) a resiliently elastic tubular universal adapter for sealingly slidingly stretching onto a water discharging spout for mounting said filter device thereon whereby said universal adapter enables said filter device to be removably sealingly mounted on water discharging spouts of different external diameters; and (d) a discrete tubular sleeve including said resiliently elastic tubular universal adapter wherein said sleeve has a dual material construction including a rigid plastic tubular fitment integrally formed with said resiliently elastic tubular universal adapter.

* * * * *